United States Patent [19]

Hinze et al.

[11] 4,196,108
[45] Apr. 1, 1980

[54] CAPROLACTAM COPOLYAMIDES USEFUL AS HOT MELT ADHESIVES FOR TEXTILES

[75] Inventors: Adrien G. Hinze, Dordrecht; Hendrik G. Stigter, Berkenwoude; Maria L. A. Slettenhaar-von Piekartz, Gouda, all of Netherlands

[73] Assignee: Emery Industries, Inc., Cincinnati, Ohio

[21] Appl. No.: 879,028

[22] Filed: Feb. 21, 1978

[30] Foreign Application Priority Data

Feb. 18, 1977 [GB] United Kingdom ............... 6945/77

[51] Int. Cl.² .................. C08L 91/00; C08G 69/36
[52] U.S. Cl. .................. 260/18 N; 525/420; 525/432; 528/310; 528/324
[58] Field of Search ............. 260/78 L, 78 A, 18 N; 528/324

[56] References Cited

U.S. PATENT DOCUMENTS

| | | | |
|---|---|---|---|
| 3,637,551 | 1/1972 | Sprauer | 260/18 N |
| 3,784,495 | 1/1974 | Sprauer | 260/857 R |
| 3,850,887 | 11/1974 | Halas et al. | 260/78 L |
| 3,852,226 | 12/1974 | Sprauer | 260/18 N |
| 3,919,033 | 11/1975 | Gill et al. | 260/78 L |
| 3,933,762 | 1/1976 | Naito et al. | 260/78 L |
| 3,989,678 | 11/1976 | Furukawa et al. | 260/78 L |
| 4,045,389 | 8/1977 | Drawert et al. | 260/18 N |

*Primary Examiner*—Harold D. Anderson
*Attorney, Agent, or Firm*—G. A. Baracka

[57] ABSTRACT

Polyamides having at least three different recurring polyamide repeating units are provided herein. These polyamides are useful hot melt adhesives for textiles and exhibit low softening point, high viscosity, high adhesive strength and good detergent and dry cleaning resistance.

5 Claims, No Drawings

CAPROLACTAM COPOLYAMIDES USEFUL AS HOT MELT ADHESIVES FOR TEXTILES

BACKGROUND OF THE INVENTION

1. Field of the Invention

This invention relates to polyamides useful as adhesives in textile applications where two or more textile materials are adhered by the application of heat.

2. Description of the Prior Art

Hot melt adhesives for textiles must satisfy a number of requirements such as having a low softening point, high viscosity, high adhesive strength and resistance to dry cleaning and detergent solutions. A number of polyamide hot melt adhesives based on caprolactam, nylon 6,6 and nylon 6,9 are known, however, the dry cleaning resistance and detergent resistance of these polyamide products is not completely satisfactory. It has been proposed to replace all or a portion of the nylon 6,6 or nylon 6,9 in these formulations with laurin lactam. While the properties of the resulting polyamide are somewhat improved, these products are still not totally satisfactory from a performance standpoint and also their manufacture is cumbersome since it is first necessary to prepare the polylaurin lactam and then subsequently conduct an interamidation with caprolactam and/or other nylon.

SUMMARY OF THE INVENTION

It has now quite unexpectedly been discovered that certain polyamides having at least three, and preferably four or more, different recurring polyamide repeating units are useful as hot melt adhesives for textiles, in particular for interlinings, and have superior properties. The polyamides of this invention have repeating units derived from:

(a) nylon 6 (polycaprolactam);
(b) a polyamide derived from hexamethylene diamine and an α,ω-dicarboxylic acid having from 6 to 9 carbon atoms;
(c) a polyamide derived from azelaic diamine (nonamethylene diamine) an an αω-dicarboxylic acid having from 9 to 12 carbon atoms; and optionally
(d) an α,ω-aliphatic diamine having from 5 to 7 carbon atoms and polymeric fatty acid.

To obtain the improved compositions of this invention, (a) will constitute from about 10–50% by weight of the recurring groups making up the polyamide, (b) will constitute from about 10–50% by weight of the groups, (c) will constitute from about 10–50% by weight of the groups and (d) can be present in an amount up to about 50% by weight. The polyamides are produced by polycondensation of the constituents which can be in the condensed (polymeric) form or present as the individual components in quantitites such that the distribution of the recurring groups is as defined above. The resulting polyamide hot melt adhesive will generally have an acid value from 0 to 15, an amine value from 0 to 5 and softening point between 100° 1 C. and 120° C.

DETAILED DESCRIPTION

The polyamides of this invention, which have superior properties and are useful as hot melt adhesives in textile applications and particularly for interlinings, have at least three different recurring polyamide units and are derived from:

(a) nylon 6 (polycaprolactam);
(b) nylon 6,6-6,9, that is, a polyamide derived from hexamethylene diamine and an α,ω-dicarboxylic acid of the general formula

wherein R is a $C_4$-$C_7$ alkylene radical (bivalent aliphatic hydrocarbon radical);
(c) nylon 9,9-9,12; that is, a polyamide derived from azelaic diamine (nonamethylene diamine) and an α, ω-dicarboxylic acid of the general formula:

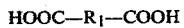

wherein $R_1$ is a $C_7$-$C_{10}$ alkylene radical; and optionally,
(d) α, ω-aliphatic diamine of the general formula

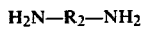

where the radical $R_2$ is a $C_5$-$C_{7b}$ alkylene radical and polymeric fatty acid.

The quantities of components (a)–(d) can be varied, however, (a) will generally constitute from about 10–50% by weight of the recurring groups, (b) will constitute from about 10–50% by weight of the groups, (c) will constitute from about 10–50% by weight of the groups and (d), when present, will range up to about 50% by weight.

The polyamide hot melt adhesive resins are prepared by polycondensation of the constituents or the individual ingredients in the quantities indicated above. In other words, the nylons can be condensed as such or the reactants from which the various nylons are derived can be used for the reaction. The polycondensation can be carried out as a single reaction step empolying reaction conditions known to the art, generally by heating the reaction mixture for several hours at a temperature of 180° C. to 300° C. and preferably under an inert atmosphere while removing water of reaction.

The reactants can be combined in the form of their amides, salts, free acids, lower alkyl esters thereof and amines in the quantitites by weight as indicated above and reacted. The starting material for most of these products are commercially available as are some of the polyamides and their salts. Nylon 6, nylon 6,6, nylon 6,9, their salts and starting materials (caprolactam, adipic acid, azelaic acid and hexamethylene diamine) are commercially available. Nylon 9,9 and nylon 9,12 are based on commercially available $C_9$ and $C_{12}$ α, ω-dicarboxylic acids (azelaic acid and dodecanedioic acid) and nonamethylene diamine. Nonamethylene diamine may not be commercially available but the preparation of this material is described in Beilstein, Volume IV, Drittes Erganzungswerk, p. 617. Suitable dicarboxylic acids which can be used and are commercially available include adipic acid, pimelic acid, suberic acid, azelaic acid, sebacic acid, brassylic acid and α, ω-dodecanedioic acid. Hexamethylene diamine and the polymeric fatty acid are also commercially available. The polymeric fatty acids are obtained by the dimerization of unsaturated fatty acids and can be hydrogenated prior to use. Preferred dimer acids for the preparation of the polyamide adhesive resins of this invention will contain at least 85% by weight dimer and, more preferably, greater than 90% by weight dimer. The dimer is most usually a $C_{36}$ dibasic derived from an unsaturated $C_{18}$ fatty acid or mixture thereof. The remainder of the dimerized product will consist of predominantly monomer, trimer and higher oligomers. Purified dimer acids are normally obtained by purification of the dimerized fatty acid by molecular distillation or solvent extraction.

The starting materials are usually combined in such relative quantities that roughly the same equivalents of amine and carboxyl groups are present, however, a small excess of mono- or dicarboxylic acid may be present. The polyamide adhesive resins obtained by the polymerization and/or polycondensation reaction are solid products having an acid value from 0 to 15, an amine value from 0 to 5 and a softening point between about 100° C. and 120° C. By proper adjustment of the reactants, resins which have melting points as low as 85°–90° C. can be obtained.

The polyamide resins of this invention are used as hot melt adhesives for textiles and can be applied to the textile material in solid form, by scattering small particles of the resin or a powder dispersion thereon, or the resin can be dissolved in a suitable solvent and applied to the textile material from solution. The second material to be bonded is then placed in contact with the resin and heat applied to the resulting layered construction so as to effect fusion of the textile materials.

The following examples illustrate the invention more fully, however, they are not intended as limitation on the scope thereof.

EXAMPLE I

Into a 4-liter reaction flask fitted with stirrer, gas inlet tube and a 25 cm Vigreaux column were charged:
750 g caprolactam
750 g salt of a polyamide derived from hexamethylene diamine and adipic acid
750 g salt of a polyamide derived from nonamethylene diamine and azelaic acid
19 g azelaic acid
250 g salt derived from hexamethylene diamine and distilled hydrogenated dimer fatty acid—Empol 1010 (registered trademark of Emery Industries, Cincinnati, Ohio) which contains 97% of $C_{36}$ dimer.

The contents of the flask were then slowly heated over a period of about 4 hours to 250° C. with stirring while bubbling nitrogen through the reaction mixture and removing water of reaction. The temperature was subsequently raised to 270° C. and maintained for 4–5 hours. The final product thus obtained had the following properties:
viscosity at 180° C. (poise): 2600
softening point (°C.): 111
acid value: 8.7
amine value: 0.5

This polyamide proved to be an excellent hot melt adhesive, particularly for interlinings, and exhibited very good detergent and dry cleaning substance.

EXAMPLE II

The procedure of Example I was repeated, except that the following reactants were charged to the reactor:
750 g caprolactam
750 g salt of a polyamide derived from hexamethylene diamine and adipic acid
1,000 g salt of a polyamide derived from nonamethylene diamine and azelaic acid
25 g azelaic acid The resulting product had a viscosity at 180° C. of 2550 poise, softening point of 107° C., acid value of 8.8 and amine value of 0.4. The polyamide was found to be an excellent hot melt adhesive.

EXAMPLE III

According to the procedure described in Example I, the following substances were polymerized:
466.7 g caprolactam
466.7 g 6,6 nylon salt
622.3 g 9,9 nylon salt and
13 g azelaic acid
The product thus obtained had the following properties:
viscosity at 180° C. (poise): 4100
softening point (°C.): 105
acid value: 7.5
amine value: 0.7

EXAMPLE IV

The process of Example I was repeated with the following reactants:
450 g caprolactam
450 g salt of a polyamide derived from hexamethylene diamine and azelaic acid
450 g salt of a polyamide derived from nonamethylene diamine and azelaic acid
19 g nonamethylene diamine
20 g propionic acid
150 g salt derived from hexamethylene diamine and Empol 1010 ®.
The resulting polyamide adhesive resin had a viscosity at 180° C. of 548 poise, softening point of 210° C., acid value of 2.0 and amine value of 2.1.

EXAMPLE V

According to the procedure of Example I, the following substances were polymerized:
450 g caprolactam
450 g salt of a polyamide derived from hexamethylene diamine and azelaic acid
580 g salt of a polyamide derived from nonamethylene diamine and dodecane dioic acid
20 g $\alpha,\omega$-decanedicarboxylic acid
The product obtained had the following properties:
viscosity at 180° C. (poise): 4960
softening point (°C.): 113
acid value: 9.5
amine value: 0.5

This polyamide too, proved to be an excellent hot melt adhesive for textiles having good detergent and dry cleaning resistances upon repeated cleaning operations.

We claim:
1. A polyamide resin useful as a hot melt adhesive consisting essentially of recurring units obtained by reacting in an inert atmosphere at a temperature of 180°–300° C. while removing water of reaction
   (a) 10–50% by weight, based on the total composition, caprolactam;
   (b) 10–50% by weight, based on the total composition, of a polyamide or polyamide salt derived from hexamethylene diamine and an alpha-omega dicarboxylic acid of the formula HOOC—R—COOH where R is a $C_4$–$C_7$ bivalent aliphatic hydrocarbon radical;
   (c) 10–50% by weight, based on the total composition, of a polyamide or polyamide salt derived from nonamethylene diamine and an alpha-omega dicarboxylic acid of the formula HOOC-$R_1$—COOH where $R_1$ is a $C_7$-$C_{10}$ bivalent aliphatic hydrocarbon radical; and (d) an amount up to 50% by weight, based on the total composition, of a polymeric fatty acid and alpha-omega aliphatic diamine of the formula $H_2N$—$R_2$—$NH_2$ where $R_2$ is a $C_5$-$C_7$ alkylene radical, a polyamide or polyamide salt derived from said polymeric fatty acid and diamine.

2. The polyamide of claim 1 wherein the aliphatic diamine is hexamethylene diamine and the polymeric fatty acid is a dimer acid containing at least 85% by weight $C_{36}$ dicarboxylic acid.

3. The polyamide of claim 1 which has an acid value from about 0 to 15, amine value from about 0 to 5 and softening point from about 100° C. to about 120° C.

4. The polyamide of claim 3 wherein the aliphatic diamine is hexamethylene diamine and the polymeric fatty acid is a hydrogenated dimer acid containing at least 85% by weight $C_{36}$ dicarboxylic acid.

5. The polyamide of claim 4 wherein the dimer acid contains greater than 90% by weight $C_{36}$ dicarboxylic acid.

* * * * *